Oct. 14, 1969   R. H. SCHOBER   3,472,631
APPARATUS FOR CARRYING OUT EXOTHERMIC CATALYTIC GAS REACTIONS
Filed April 25, 1966   3 Sheets-Sheet 1

INVENTOR
ROBERT HELMUT SCHOBER

BY Wenderoth, Lind & Ponack
ATTORNEYS

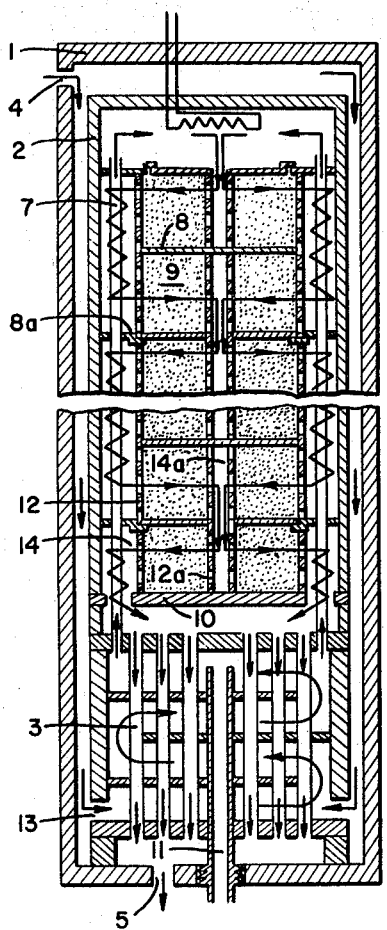

United States Patent Office 3,472,631
Patented Oct. 14, 1969

3,472,631
APPARATUS FOR CARRYING OUT EXOTHERMIC
CATALYTIC GAS REACTIONS
Robert H. Schober, 8 Carl Boschweg, Linz, Austria
Filed Apr. 25, 1966, Ser. No. 544,865
Int. Cl. B01j 9/00
U.S. Cl. 23—289                                    11 Claims

ABSTRACT OF THE DISCLOSURE

Apparatus for carrying out exothermic catalytic gas reactions wherein a feed gas is catalytically converted into reaction gases by successive passage through a plurality of catalyst layers, said apparatus comprising a catalyst-containing main casing, an inlet means, an outlet means and a control means housed in said main casing for controlling the temperature of the gases passing through said main casing, said control means comprising at least one set of cooling tubes positioned at the side of said casing and coextensive with but in spaced relation to the catalyst, means for directing fresh gas to and through the interior of the tubes prior to contact with the catalyst, and means for directing reaction gases from the catalyst at spaced points thereof externally around said tubes and in heat exchange relationship with the fresh gas flowing through the latter.

In exothermic catalytic gas reactions, especially at high temperatures, the temperatures along the gas path at the catalyst have to be controlled as accurately as possible in order to achieve optimal yields and to suppress side reactions. This is generally realized by heat exchange, namely, by direct cooling of the hot reaction gas by admixture therewith of cooler fresh gas or by indirect cooling by means of the same (reaction) gas or extrinsic gas or steam or by various liquid cooling media.

Especially in catalytic high pressure syntheses of ammonia from nitrogen and hydrogen, but also in other catalytic gas processes, such for example as in the synthesis of hydrocyanic acid or of methanol, the conversion of carbon monoxide, the synthesis of phthalic acid or of melamine, the most diverse heat exchange systems have been proposed or are in use, those being increasingly preferred, from the standpoint of product separation, which by means of indirect heat exchange in the interior of the reactor seek to achieve, without the use of extrinsic or foreign media, approximation of the temperature course, in all parts of the reactor, to an optimal curve which can be calculated for every type of reaction. For this purpose, use has hitherto been made, with varying success, of fresh gas-cooling tubes in the contact bed, contact-filled tubes, and sets of heat exchange tubes interposed between individual catalyst layers.

The present invention makes possible, in catalytic gas synthesis and more especially in the synthesis of ammonia, still more far-reaching approximation of the optimal temperatures of the reaction to the ideal temperature course curve, with a still higher $NH_3$-production than has heretofore been usual, this being accomplished with simplest construction of the reactor parts, whereby the cost of and the assembly and disassembly of such parts are as inexpensive as possible while at the same time lowest resistance to gas flow is realized by the omission of complicated flow-retarding connections and of narrow gas-flow passages.

The method according to this invention of carrying out exothermic catalytic gas reactions, and more especially the synthesis of ammonia, with reactor interior temperature regulation by means of stepwise indirect cooling of hot reaction gases after discharge thereof from individual or from two or more catalyst layers, by fresh synthesis gas mixture, is characterized essentially in that the fresh synthesis gas stream which is utilized in per se conventional manner for the cooling of the pressure casing of the reactor and is then preheated in a main heat exchanger, flows through one or two bundles of cooling tubes which extend through to above the initial catalyst layer, these tubes, where two bundles thereof are used, being arranged on diametrically opposite sides of the reactor interior, after which the gas passes through a catalyst column subdivided by horizontal baffle plates with alternate segment-like-cut-out gas passages and in this way flows along—now in the form of hot reaction gas—and contacts only one side or both sides, alternately, of the sections corresponding to the turning points of the shortened baffle plates, optionally on both sides of the cooling tube bundles arranged alongside the catalyst column, in counter-current to fresh gas, and finally passes through the tubes of the main heat exchanger to the reaction gas outlet.

The approximation of the temperature course at the catalyst to the ideal temperature course curve of the reaction is regulated according to the invention by the number of subdivisions of the catalyst column and by the number of subdivisions of the catalyst column and by the thus-realized cool zones along the peripherally extending cooling tubes. The actual number thereof depends on the conditions of operation and on the size of the reactor. The higher the catalyst column is, the finer can the stepwise heat exchange relative to fresh gas be adjusted by increasing the number of stages.

In this way, clogged or choked passages for the gas stream and also dangerous superheated spots in the catalyst with reversing of the reaction and disintegration of the catalyst grains are effectively prevented and at the same time the gas path through the catalyst is elongated without having to increase the size of the reactor. Thus, in simple manner, either time of dwell of the synthesis gas mixture in the catalyst is lengthened or the quantity of gas throughput and therewith of the conversion is increased.

On the accompanying sheets of drawing,

FIG. 3 is a segmental view of a constructional detail according to this invention.

FIG. 4 is a diagrammatic segmental view of a modified constructional detail.

FIG. 5 is a partial view of an alternative construction of the FIG. 1 apparatus.

FIG. 6 shows a further alternative construction according to the invention.

FIG. 7 is a cross-sectional view through FIG. 6.

Figure 1:
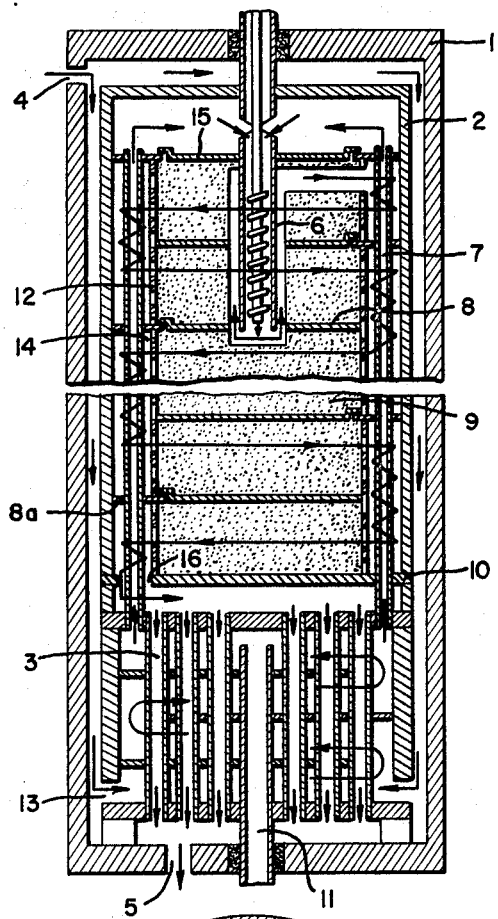
FIG. 1 is a diagrammatic vertical sectional view through one embodiment of apparatus with two bundles of cooling tubes, according to the invention.
Figure 2:
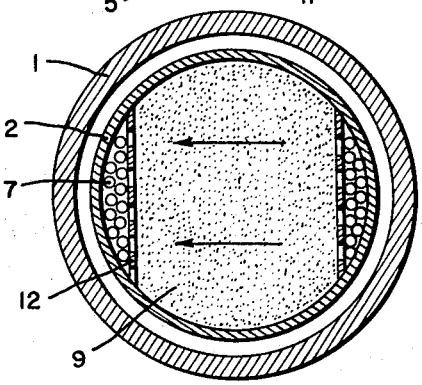
FIG. 2 is a diagrammatic horizontal sectional view therethrough.

Reference is first made to FIGS. 1 and 2. The high pressure member or furnace casing 1, which is provided with a fresh gas supply inlet 4 and a reaction gas discharge outlet 5, is provided at the lower end thereof with a per se conventional heat exchanger with cooling tubes 3 and thereabove with an inserted jacket or guide member 2 which separates the catalyst from the fresh gas stream or flow. Disposed within the sheet 2 are the catalyst column 9 which is subdivided into individual sections by baffle plates 8, and also two bundles of cooling tubes 7, disposed in diametrically opposite relation to each other and extending through from the main heat exchanger 3 up to or above the first or uppermost catalyst layer. (One of the two bundles of cooling tubes 7 may be omitted.) The baffle plates 8 are alternately secured on one side thereof in fixed and gas-tight relation to the inner wall of the guide casing 2 and extend on the other side thereof to just short of a peripherally disposed cooling tube bundle 7. This arrangement provides gas passageways from the respective catalyst layers to the sections of the cooling tubes corresponding to the turning points 14. The gas thus flows through each successive catalyst layer more or less horizontally in the reverse direction to the preceding catalyst layer and around the cooling tubes 7 at the turning points 14 countercurrent to the fresh gas. The lowermost catalyst layer rests on a bottom plate 10 having an opening 16 for passage of the reaction gas into the main heat exchanger 3. The topmost layer is traversed centrally by a per se conventional burner tube 6. To control any possible temperature fluctuations upwardly, a cold gas supply conduit 11 can be provided, preferably in the hottest part of the main heat exchanger 3. However, this is not absolutely essential to the realization of the described effects. Also, as safety measures, cold gas supply conduits can be provided at selected turning points 14 for the hot reaction gas stream.

A further especially effective embodiment of such cold gas supply, particularly into the upper parts of the cooling tubes 7, is diagrammatically shown in FIG. 4 of the drawings. According to this embodiment, the cooling tubes 7, which are interrupted at this point, open into a common chamber 17, into which, if required, cold fresh gas can be supplied from the exterior through a separate supply conduit 18 extending through the guide member 2.

Figure 9:
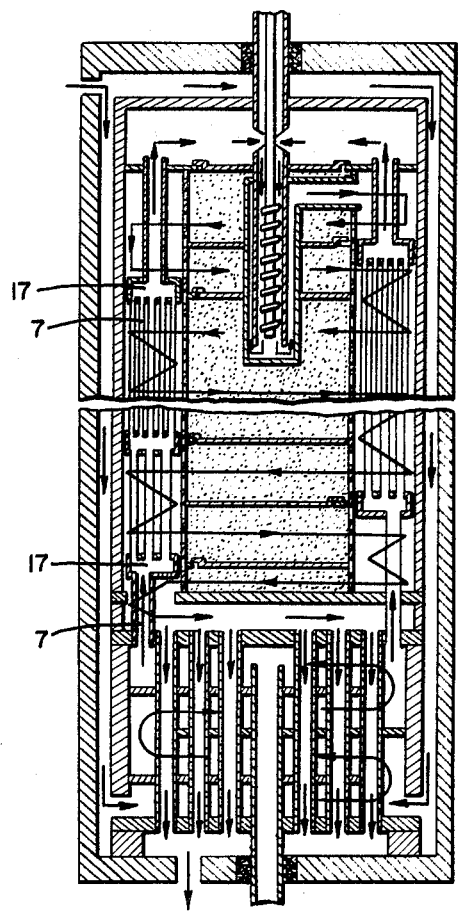
FIG. 9 is a view corresponding to FIG. 1 but incorporating changes in the cooling tubes arrangement.
Figure 8:
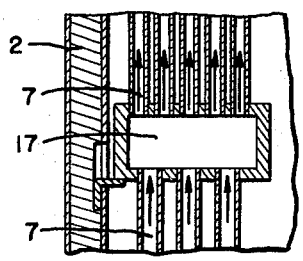
FIG. 8 is a diagrammatic segmental view of another modified constructional detail.

Such a common chamber 17 as is shown in FIG. 4 can also serve, if necessary, to increase or decrease, as required, the number of cooling tubes 7 along certain stretches of their length, when this is desired for close adaptation of the cooling to any local temperature conditions. This is illustrated in FIG. 8 (with omission of the fresh air supply conduit of FIG. 4). FIG. 9 shows various practical possibilities of arrangement of the described increase or decrease of the number of cooling tubes 7 by interposition of common chambers 17.

The turning or baffle plates 8 (of FIG. 1) are advantageously made separable (in parts), so that the largest parts thereof can be successively lifted off, on removal of the catalyst filling, or can be successively placed in position on refilling with catalyst, relatively to the segments 8a through which the cooling tubes extend and which may be fixed to the inner wall of the guide tube 2. The uppermost cover plate 15 closes the catalyst inlet position, forcing fresh air to come in through the substantially centrally disposed burner tube 6.

The catalyst charge 9 can completely fill the interior of the guide tube or shell 2, but its extent can also be delineated by perforated or slotted sheets or by grids positioned in front of one or both symmetrically arranged cooling tube bundles 7 (cf. FIG. 2). In such case, as shown, correspondingly dimensioned partition sections 12, which extend from one of the plate sections 8a to next higher one, are inserted prior to the filling of the corresponding catalyst space. In order to be able to handle these inserts 12 rapidly, the edge of the fixed section 8a which extends toward the interior of the reactor can be appropriately crimped or otherwise configured for the reception of the partition 12 as well as of the horizontal baffle plate 8 (cf. FIG. 3). Leakage from the inner gas stream with this simple type of mounting of the parts is minor and inconsequential whereas the main gas stream can readily course through the described reactor construction. For the same reason, it is sometimes sufficient not to weld the cooling tubes 7 to the fixed edge sections 8a of the baffle plates 8 but merely to insert them through corresponding openings provided in such sections 8a. This makes the assembly and disassembly of the parts, the filling and removal of the catalyst, and the replacement of individual sections extremely simple and rapid.

The subdivision of the reactor interior makes it possible to insert the catalyst in pre-filled baskets or the like, corresponding to the several catalyst layers.

The guide tube 2 can be supported directly on the bottom of the reactor whereby the main heat exchanger is relieved of the weight thereof, or it may be supported on a projecting portion of the bottom of the said heat exchanger.

A further advantage of the construction according to the invention is that the whole insert can expand upwardly without hindrance and with no danger of thermal stress or buckling.

The described synthesis furnace construction is not, like other heretofore conventional furnace types, limited to a certain heighth or width. To the contrary, because of the good gas penetrability, it is possible to build so-called oversized constructions which, again in contrast to usual reactor types, operate perfectly, especially if the peripheral tube bundles 7 are arranged vertically above each other. By oversized structure, there are meant synthesis furnaces of about 12 to 18 meters height.

In the recumbent arrangement of such furnaces, it is expedient in the interest of simplification of the mounting of catalytic units, to provide closable filling openings in guide tube 2 for each individual catalyst layer, just below the upper tube bundle 7 or the corresponding partitions or the like 12.

The filling is, with such arrangement, effected in the usual way by pouring the catalyst in through the aforementioned filling holes. The furnace insert is, after the filling of a chamber, shoved lengthwise thereof into the pressure casing.

In so far as it may be desired to hold the initial temperature of the reaction as high as possible, the principle of the present invention may be omitted for a part of the apparatus. This possibility is illustrated by the diagrammatic showing of FIG. 5 of the drawings, wherein preferably the first stage of the embodiment according to FIG. 1 or, if desired, additional catalyst layers are not cooled by cooling tube bundles 7 of the invention. To this end, the layers which are not to be cooled are encompassed by an annular plate 21 which extends up to the topmost cover plate 15 and which carries baffle plates 8, 8a in so far as these are provided interiorly of the annular plate 21. The stream of fresh gas coming from the cooling tubes 7 now follows the previously described horizontal and directionally alternating path through the catalyst layers 9 sealed off from the cooling tubes 7 by plate 21, but is then turned about by annular plate 19 which surrounds plate 21, and is first led beneath the uppermost cover plate 15 at the upper part of the cooling tubes 7 and then the now very hot reaction gas stream passes along the said cooling tubes, with energetic and rapid cooling, into the other stages, according to FIGS. 1, 6 or 7, which are situated below plate 20 and which are normally cooled.

Such a seal can also be provided as required at other places in the furnace assembly, in addition to or instead of the uppermost catalyst layers. Particularly for the lower positioned layers, it can be sufficient to provide an annular plate, sealed at the top and not at the bottom, between the cooling tubes 7 and the perforated partition 12.

Figure 10:
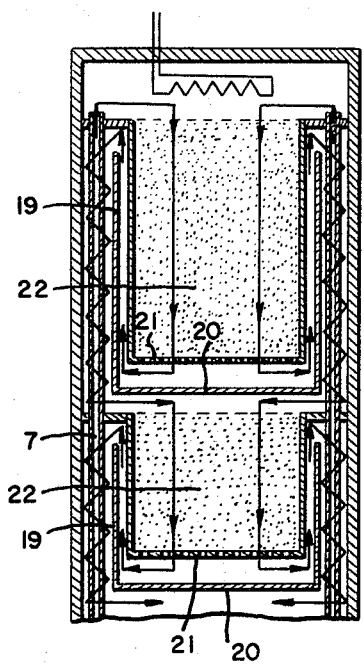
FIG. 10 is a diagrammatic showing of an arrangement wherein baffle plates are omitted in a part of the apparatus.

The use of this principle, namely the exclusion of individual, and more especially the uppermost or entry catalyst layers, from the immediate cooling of the reaction gases by the cooling tubes 7, by means of bottom sealed annular plates 19, 20, according to FIG. 5, may be accompanied by complete omission of subdivision of the catalyst by baffle plates 8, 8a. in such case, as shown in FIG. 10, the first and, if desired, the second catalyst layer rest upon grids or perforated plates 21, and the fresh gas stream, preheated in the cooling tubes 7, enters from above into the catalyst 22, passes through the length of the latter and then, as hot reaction gas, is guided by the annular plate 19 to the topmost point of the cooling tubes 7. This procedure can be repeated if desired in the next lower catalyst layer.

A further embodiment according to the principle of the presently described invention is shown in vertical and horizontal sections in FIGS. 6 and 7. In this embodiment, which is otherwise constructed according to FIGS. 1 and 2, the catalyst column is longitudinally subdivided by two substantially axially and slightly spaced perforated walls 12a. Correspondingly, the baffle plates 8 and 8a are arranged for symmetrical alternate turning of the synthesis gas stream at the peripheral turning points 14 to the cooling tubes 7 and to the central passage 14a. This embodiment is especially suitable for oversized synthesis furnaces. It shortens the gas path through the individual catalyst layers and simultaneously also provides the advantage of the possibility of more closely regulating the temperature conditions.

What is claimed is:

1. Apparatus for carrying out exothermic catalytic gas reactions wherein fresh gas which is to be catalytically converted into reaction gases by contact with the corresponding conversion catalyst is successively passed through a plurality of layers of said catalyst and the resultant reaction gases are then discharged from the last-traversed catalyst layer, said apparatus consisting essentially of a catalyst-containing main casing provided with inlet means at one end thereof for said fresh gas and with outlet means at the other end thereof for said reaction gases, and control means housed in said main casing for controlling the temperature of the gases passing through said main casing from said inlet means to said outlet means, said control means consisting essentially of at least one set of at least one cooling tube each of said at least one set positioned at a different side of and coextensive with but in spaced relation to the catalyst, means for directing fresh gas to and through the interior of said at least one tube prior to coming into contact with the catalyst, and means for directing reaction gases from said catalyst at spaced points thereof externally around said at least one tube and in heat exchange relationship with the fresh gas flowing through the latter, at correspondingly spaced points along said at least one tube.

2. Apparatus for carrying out exothermic catalytic gas reactions wherein fresh gas is successively passed through a plurality of layers of catalyst and the resultant reaction gases are then discharged from the last-traversed catalyst layer, said apparatus consisting essentially of a main casing provided with inlet means at one end for fresh gas and outlet means at the other end for reaction gases, a heat exchanger disposed adjacent the outlet end of the casing, juxtaposed catalyst layers interposed between said heat exchanger and the gas inlet end of said main casing, cylindrical guide means connected with said heat exchanger and disposed interiorly of said main casing and between the latter and the catalyst layers for guiding the flow of fresh gas to said main heat exchanger, at least one perforated partition interposed between said catalyst layers and said cylindrical guide means and thereby forming at least one chamber of segmental cross-section therebetween, at least one cooling tube disposed in each of and extending through the length of said at least one chamber, said at least one tube being mounted at one end on said heat exchanger to receive heated fresh gas therefrom, said at least one tube being substantially coextensive with but in spaced relation to said juxtaposed catalyst layers, means for guiding gas after traversal through said at least one cooling tube to the catalyst layer remotest from said heat exchanger, baffle plates interposed between and substantially surrounding the individual catalyst layers for guiding said gas successively through successive catalyst layers and in successively opposed directions of flow, said baffle plates providing turning points for said gas flow whereby the gas passes around the said at least one cooling tube en route from one catalyst layer to the next, and means for passing the gas from the last-traversed catalyst layer through said main heat exchanger, the gas from the latter being discharged through said outlet means.

3. Apparatus according to claim 2, wherein each baffle plate comprises a fixed portion in contact with said cylindrical guide means on the interior side thereof, said at least one cooling tube extending through said fixed portion.

4. Apparatus according to claim 2, comprising a plurality of perforated partitions, said partitions being located at diametrically opposed points on said cylindrical guide means and correspondingly a plurality of cooling tubes severally disposed between said partitions and guide means.

5. Apparatus according to claim 3, wherein the remaining portion of each baffle plate is removably disposed between adjacent catalyst layers.

6. Apparatus according to claim 2, wherein said at least one cooling tube is interrupted intermediately of the extent thereof by a common mixing chamber for the gas flowing therethrough, and means for supplying cold gas to said mixing chamber.

7. Apparatus according to claim 6, wherein the number of cooling tubes leading into said mixing chamber is different from the number leading out of said chamber.

8. Apparatus according to claim 1, and means for vertically subdividing said catalyst substantially axially thereof into two catalyst masses, each of which is associated with said at least one set of said at least one cooling tube.

9. Apparatus according to claim 2 containing a partition disposed between said at least one cooling tube and at least one but not all of said catalyst layers for the prevention of passage of the gas in heat exchange relation with said at least one cooling tube prior to its entry into a successive catalyst layer.

10. Apparatus according to claim 2 wherein said baffle plates and said cylindrical guide means are arranged so that said gas passes through said catalyst layers in a direction substantially parallel to the direction of said at least one cooling tube.

11. An apparatus according to claim 2 wherein said baffle plates and said cylindrical guide means are arranged so that said gas passes through said catalyst layers in a direction substantially transverse to the direction of said at least one cooling tube.

References Cited

UNITED STATES PATENTS

| 1,686,371 | 10/1928 | Fauser | 23—289 |
| 1,909,378 | 5/1933 | Richardson | 23—289 X |
| 2,512,586 | 6/1950 | Stengel | 23—288 |
| 3,146,074 | 8/1964 | Drechsel et al. | 23—288 |

FOREIGN PATENTS

| 1,142,586 | 1/1963 | Germany. |
| 795,403 | 5/1958 | Great Britain. |

JOSEPH SCOVRONEK, Primary Examiner